US009581129B2

(12) United States Patent
Leijon et al.

(10) Patent No.: US 9,581,129 B2
(45) Date of Patent: Feb. 28, 2017

(54) WAVE POWER UNIT, A USE OF A SUCH AND A METHOD OF PRODUCING ELECTRIC ENERGY

(75) Inventors: Mats Leijon, Uppsala (SE); Kalle Haikonen, Uppsala (SE)

(73) Assignee: Seabased AB, Uppsala (SE)

( * ) Notice: Subject to any disclaimer, the term of this patent is extended or adjusted under 35 U.S.C. 154(b) by 174 days.

(21) Appl. No.: 13/700,618

(22) PCT Filed: May 28, 2010

(86) PCT No.: PCT/SE2010/050585
§ 371 (c)(1),
(2), (4) Date: Nov. 28, 2012

(87) PCT Pub. No.: WO2011/149397
PCT Pub. Date: Dec. 1, 2011

(65) Prior Publication Data
US 2013/0067904 A1    Mar. 21, 2013

(51) Int. Cl.
| F03B 13/18 | (2006.01) |
| B63B 35/44 | (2006.01) |
| F16F 1/40 | (2006.01) |
| E02B 9/08 | (2006.01) |

(52) U.S. Cl.
CPC .............. *F03B 13/18* (2013.01); *B63B 35/44* (2013.01); *E02B 9/08* (2013.01); *F03B 13/1865* (2013.01); *F03B 13/1885* (2013.01); *F16F 1/40* (2013.01); *B63B 2035/4466* (2013.01); *Y02E 10/38* (2013.01)

(58) Field of Classification Search
CPC .......... F03B 13/18; F03B 13/10; F16G 11/00; H02P 9/04
USPC ...................................................... 60/501–506
See application file for complete search history.

(56) References Cited

U.S. PATENT DOCUMENTS

| 2,939,291 A | * | 6/1960 | Schurman ............. B63B 21/502 |
| | | | 114/265 |
| 4,511,115 A | * | 4/1985 | Ludwigsen ............. B63B 35/44 |
| | | | 108/136 |
| 5,363,920 A | * | 11/1994 | Alexander et al. ........... 166/350 |
| 5,524,566 A | * | 6/1996 | Rapa ...................... B63B 21/00 |
| | | | 114/214 |
| 6,020,653 A | * | 2/2000 | Woodbridge et al. .......... 290/53 |
| 6,158,374 A | | 12/2000 | Free |

(Continued)

FOREIGN PATENT DOCUMENTS

| GB | 1598865 | 9/1981 |
| WO | 03058055 | 7/2003 |

(Continued)

*Primary Examiner* — Thomas Denion
*Assistant Examiner* — Shafiq Mian
(74) *Attorney, Agent, or Firm* — Dykema Gossett PLLC

(57) ABSTRACT

The invention relates to a wave power unit with a floating body (1), a submerged station (2) and flexible connection means (3) connecting the floating body (1) to the submerged station (100). The submerged station (100) has a stator 5 (5) and a moving part (6). According to the invention the flexible connection means (3) is provided with a damper (12). The damper (12) is arranged to absorb tensile forces in the flexible connection means (3). The invention also relates to a use of such a wave power unit and to a 10 method for producing and supplying electric energy.

15 Claims, 5 Drawing Sheets

(56) References Cited

U.S. PATENT DOCUMENTS

| | | | |
|---|---|---|---|
| 6,392,314 B1 * | 5/2002 | Dick | F03B 13/148 290/53 |
| 6,833,631 B2 * | 12/2004 | Van Breems | F03B 13/1845 204/194 |
| 7,045,912 B2 | 5/2006 | Leijon et al. | |
| 7,304,399 B2 | 12/2007 | Leijon et al. | |
| 7,474,013 B2 * | 1/2009 | Greenspan et al. | 290/53 |
| 7,737,568 B2 | 6/2010 | Vowles et al. | |
| 8,264,093 B2 * | 9/2012 | Moore | B63B 35/44 290/42 |
| 8,291,707 B2 * | 10/2012 | Williams | F16K 15/186 137/512.1 |
| 8,471,398 B2 | 6/2013 | Leijon et al. | |
| 9,308,969 B2 * | 4/2016 | McEvoy | B63B 21/20 |
| 2004/0251692 A1 * | 12/2004 | Leijon | F03B 13/1885 290/42 |
| 2007/0132246 A1 * | 6/2007 | Hirsch | F03B 13/1845 290/42 |
| 2009/0202306 A1 * | 8/2009 | Huang | 405/224 |
| 2011/0175360 A1 | 7/2011 | Leijon et al. | |

FOREIGN PATENT DOCUMENTS

| | | |
|---|---|---|
| WO | 2009076714 | 6/2009 |
| WO | WO 2010024741 A1 * | 3/2010 |

* cited by examiner

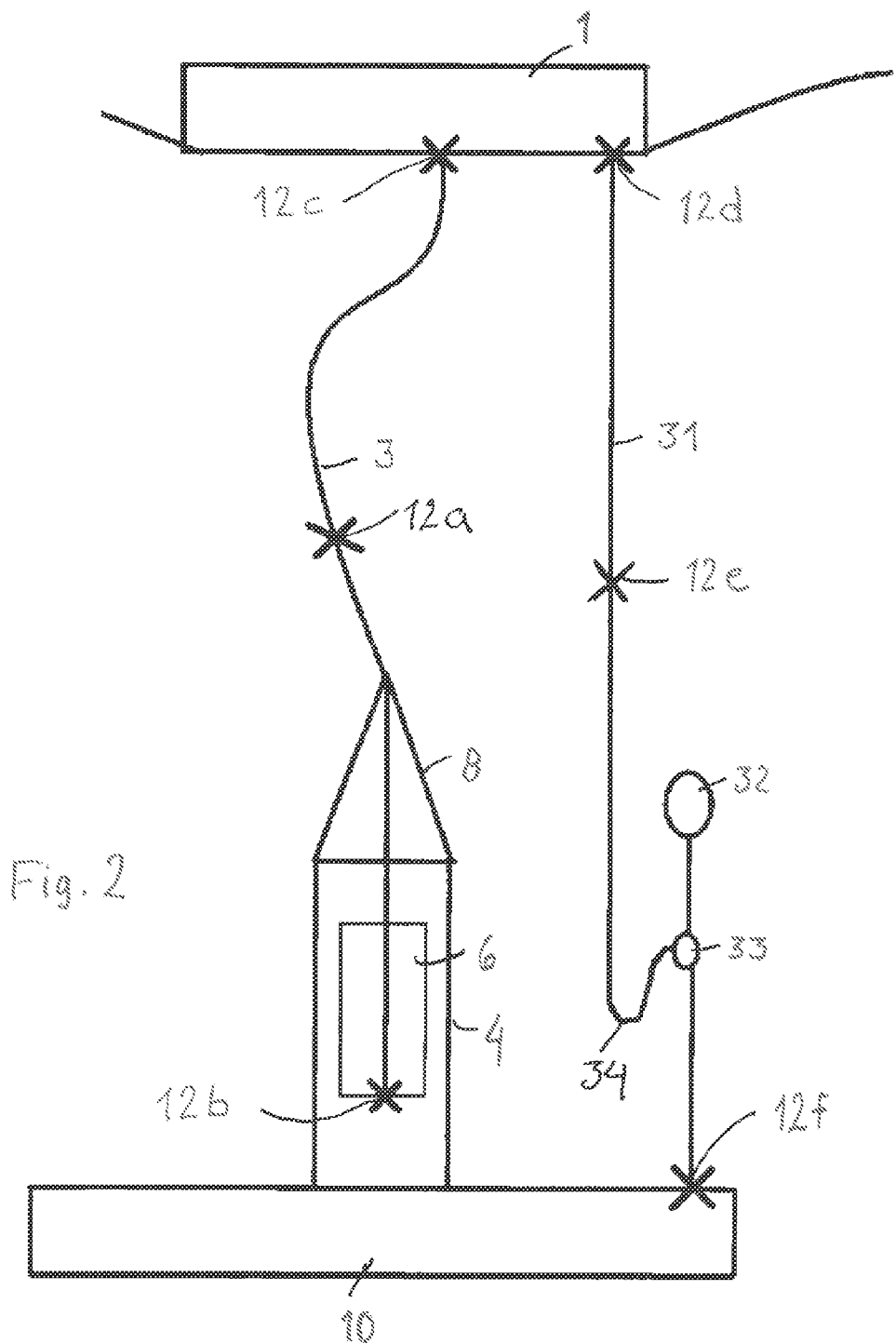

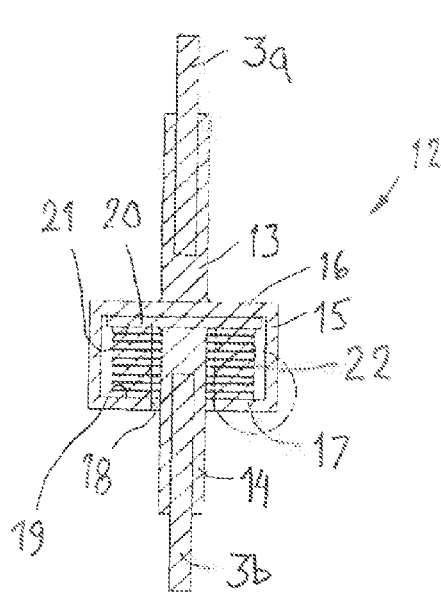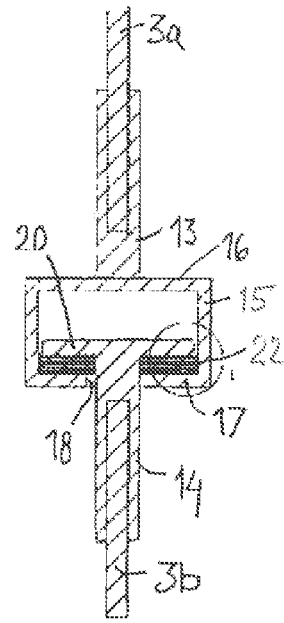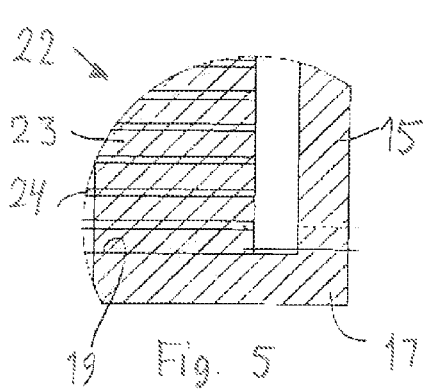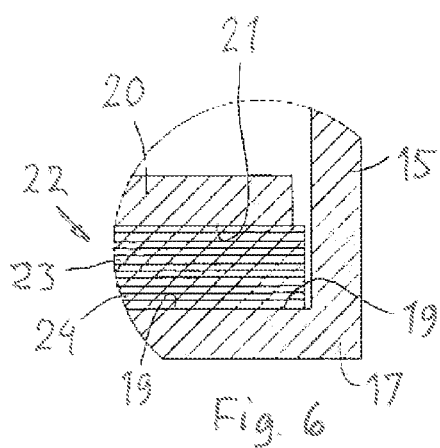

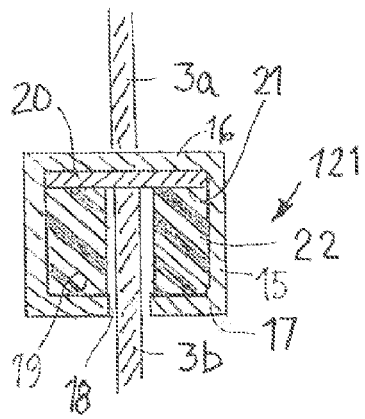
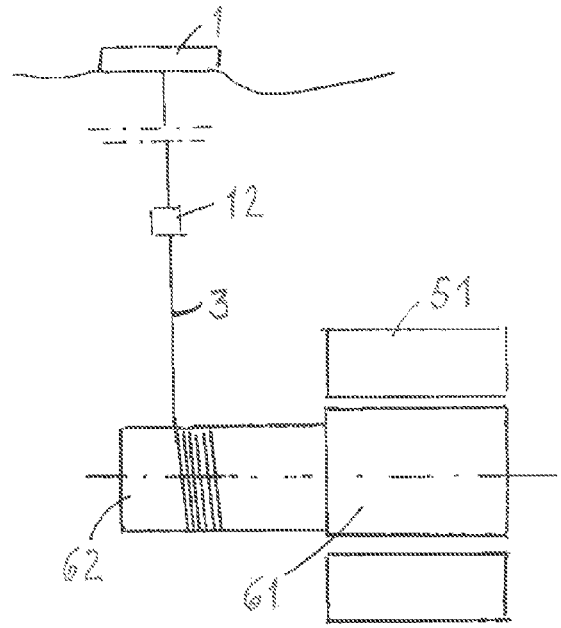
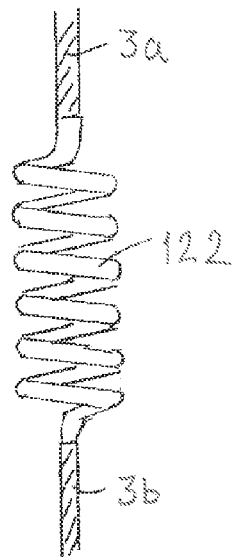
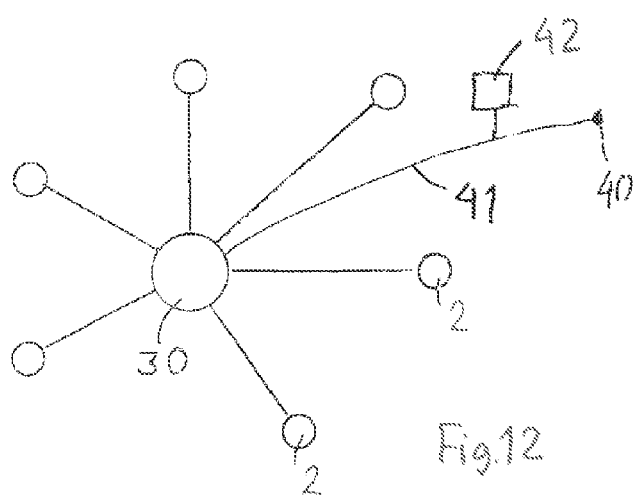

WAVE POWER UNIT, A USE OF A SUCH AND A METHOD OF PRODUCING ELECTRIC ENERGY

FIELD OF INVENTION

The present invention in a first aspect relates to a wave power unit having at least one floating body, a submerged station and at least one flexible connection means connecting the at least one floating body with the submerged station, the submerged station including a generator with a stator and a moving part.

In a second aspect of the invention it relates to the use of a wave power unit, and in a third aspect it relates to a method of producing electric power by a submerged station, which station includes a generator, anchoring the station to a sea bottom, providing at least one floating body to float on the sea surface and connecting the at least one floating body to the submerged station by at least one flexible connection means.

In the present application the terms "radial", "axial", "lateral" and the like refer to the direction of the axis defined by the reciprocating movement of centre of the translator, i.e. the centre axis if not explicitly otherwise is stated. The terms "upper" and "lower" refer to the vertical direction and relates to the locations of the components in question when the wave power unit is in operation.

By flexible connection means is meant that the means is bendable such as a chain, rope, wire, cable or the like. It does not necessarily mean that it is flexible in the longitudinal direction. In the following description the term "wire" frequently will be used for simplicity reason, but it is to be understood that this term represent any flexible connection means that is suitable in this context.

BACKGROUND OF INVENTION

Wave movements in the sea and in large inland lakes constitute a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave power unit where the moving part of the generator, i.e. the part that corresponds to the rotor in a rotating generator and in the present application called translator, reciprocates in relation to the stator of the generator. In that disclosure the stator is anchored in the sea bed. The translator is by flexible connection means, such as a wire, cable or a chain connected to a body floating on the sea. The present invention, however, is not limited to a wave power unit, in which the generator is a linear generator, but applies also to a conventional rotating generator. A wave power unit with a rotating generator is disclosed in WO/058054.

The floating body is by a wire connected to the moving part of the generator, i.e. the translator of a linear generator or the rotor of a rotating generator. When the floating body moves up and down, the wire does the same and transmits a force to the moving part of the generator such that it reciprocates or rotates. At such operation the wire will alternating be exposed to tensile forces and zero forces. The zero forces mainly occur at the ends of the reciprocating movements, but might also occur during the movement as such. When the wire is unloaded it might slack. When thereafter the force at either end of the wire begins to stretch the wire, initially a quick acceleration occurs until the wire is stretched and starts to take up the force. The result is that the wire at the end of this acceleration almost instantly alters from being unloaded to be exposed to a very high load, amplified by the dynamic effect at the sudden retardation. This is harmful to the wire and entails the risk of breakage of it.

A similar problem may be present in wires connecting the floating body to a stationary part of the submerged station as will be explained later.

SUMMARY OF INVENTION

The object of the present invention is to overcome this problem, and thus eliminate or at least reduce the risk for breakage of a wire connecting the floating body to the submerged station.

According to the first aspect of the invention this problem is solved in that a wave power unit of the kind introductionally specified includes the specific feature that the flexible connection means, e.g. a wire is provided with at least one damper arranged to absorb tensile forces in the wire.

When the wire alters from an unloaded state to a loaded state, the high dynamic forces thereby occurring will be taken up by the damper such that these excess forces will not directly act on the wire. The damper establishes a certain retardation distance, during which the excess force is absorbed. At the end of this process, the force has decreased to the normal level, i.e, the force occurring when the floating body pulls up the translator or when the translator pulls down the floating body. The damper thereby gradually is released. The spring characteristics of the damper thus is at values that it is very little affected by those normal forces but activates at those excess dynamic forces.

The invented wave power unit with such a damper thus reduces the risk for wire breakage and increases the lifetime of the wire.

According to a preferred embodiment, the damper is provided at flexible connection means connecting the floating body to the moving part of the generator.

Among those wires that connects the floating body to the submerged station, this one is the most important one, and is most exposed to the excess forces described above. The invention is therefore of particular importance when the damper is provided at this very wire.

According to a further preferred embodiment, the generator is a linear generator and the moving part is a linearly reciprocating translator.

A linear generator does not require a transformation of the movements of the floating body to a rotating movement, and is therefore normally the best alternative for a wave power unit of the kind in question. For this reason the present invention is of particular interest for this kind of generator. The problem with slack and excess forces at the end positions of the translator is also more accentuated for a linear generator than a rotating generator. The need for dampening is therefore more accentuated for a linear generator.

According to a further preferred embodiment, the damper is provided at flexible connection means forming a security device connecting the floating body to a stationary part of the submerged station.

There exists a risk that the wire connecting the floating body to the moving part of the generator may break, in spite of measures taken to avoid this. If that occurs, the floating body might drift away and get lost. In order to avoid that, the floating body can be connected by a wire or the like to a stationary part of the submerged station such as the stator frame or a base foundation thereof. This wire is only a security device and has no function during normal operation. The wire is normally not under tension but is hanging loose with a loop to allow limited lateral movements of the floating body. Should breakage of the wire connecting the floating body to the moving part of the generator occur, the wire of the security device captures the floating body. At this moment a sudden high tensile force develops in the security wire. By providing a damper at this wire it is achieved that the risk for breakage thereof is reduced. A damper at the security wire can be a complement to a damper at the wire connecting the floating body to the moving part of the generator or be an alternative to that.

According to a further preferred embodiment, the damper is located between the at least one floating body and the flexible connection means.

The damper thereby will be closed to the sea surface, and this makes it easy to install, and regarding maintenance.

According to a further preferred embodiment, the flexible connection means includes an upper section and a lower section, whereby the damper is located between the upper section and the lower section.

Thereby it is possible choose an optimal localisation of the damper taking various aspects under consideration.

According to a further preferred embodiment, the damper is located between the translator and the flexible connection means.

The damper thereby can be built as an integral part of the submerged station, which from some aspects results in a rational manufacturing of the wave power unit. The attachment to the translator can be directly to the translator body carrying the magnets or to a rigid rod at the top of the translator body, which thus being considered as a part of the translator According to a further preferred embodiment, the damper is located between the stationary part of the submerged station and the flexible connection means.

This embodiments thus refers to the damper at the security wire and has advantages of the same kind as those of the embodiment next above.

According to a further preferred embodiment, the damper includes an elastically compressible component, which component is located between a first support face and a second support face, which support faces face towards each other, the first support surface being attached to the flexible connection means and the second support surface being attached either to the at least one floating body, the moving part of the generator, the stationary part of the submerged station or to a second part of the flexible connection means, respectively.

There are in principle two alternatives for the operation of the damper. It can either absorb the load by tension, such as a simple tension spring, or by compression as suggested in this embodiment. By basing the damper on the compression principle, the characteristics of the dampening process can be made more precise and the risk that the damper breaks is lower than with a tensile damper.

According to a further preferred embodiment, the elastically compressible component includes a plurality of elastic disc-shaped bodies arranged in a stack and further includes a rigid disc-shaped member between each adjacent elastic disc-shaped bodies.

By constructing the elastically compressible component in a plurality of separated bodies the compression force will be more even distributed than if only one elastic body was used. The lifetime of the damper thereby will be increased and the characteristic of the damping force becomes more predictable. To build up the damper of a plurality of units also allows a modulized adaption to different needs regarding the dampening force by using different numbers of such standard units.

According to a further preferred embodiment, the number of flexible components is in the range of 5-10.

This range corresponds to the optimized number for most applications.

According to a further preferred embodiment, the damper includes a housing including an end wall, the inner surface of which defines one of the support surfaces, and in which housing is located a movable wall having a surface forming the other of the support surfaces, the surfaces being parallel to each other, the movable wall being perpendicular to the surfaces, and which end wall has a through hole, through which an attachment device is movable, which attachment device is attached to the movable wall.

This is a simple and practical construction of the damper, which provides a safe transfer of the forces at each side of the elastic component by the parallel support surfaces.

The invention also relates to a wave power plant that includes a plurality of wave power units according to the present invention, in particular to any of the preferred embodiments thereof.

The invention also relates to an electrical network including a connection to a wave power unit according to the present invention, in particular to any of the preferred embodiments thereof.

In the second aspect of the invention a wave power unit according to the present invention, in particular to any of the preferred embodiments thereof, is used for producing electric energy and supplying the energy to an electrical network.

In the third aspect of the invention the object is achieved in that a method of the introductionally specified kind includes the specific measures of providing at least one damper to the flexible connection means and arranging the damper to absorb tensile forces in the flexible connection means.

The invented wave power plant, the invented electrical network, the invented use and the invented method have the advantages of the invented wave power unit and the preferred embodiments thereof and which have been described above.

The above described preferred embodiments of the invention are specified in the dependent claims. It is to be understood that further preferred embodiments of course can be constituted by any possible combination of the preferred embodiments mentioned above and by any possible combination of these and features mentioned in the description of examples below.

The invention will be further explained through the following detailed description of examples thereof and with reference to the accompanying drawings.

SHORT DESCRIPTION OF THE DRAWINGS

FIG. 1. Is a schematic side view of a wave power unit according to the invention.

FIG. 2 in a similar view schematically illustrates various location of the damper.

FIG. 3 is a longitudinal section through a damper in its released state.

FIG. 4 is a section similar to that of FIG. 3 illustrating the damper in compressed state.

FIG. 5 is an enlarged detail section of FIG. 3.

FIG. 6 is an enlarged detail section of FIG. 4.

Figure 7:
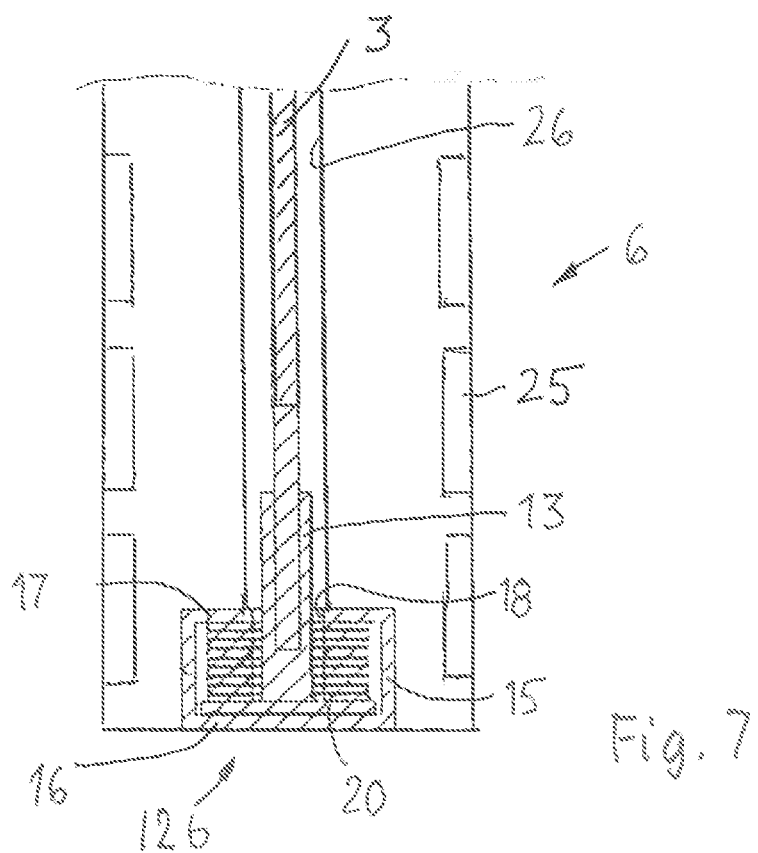
Figure 8:
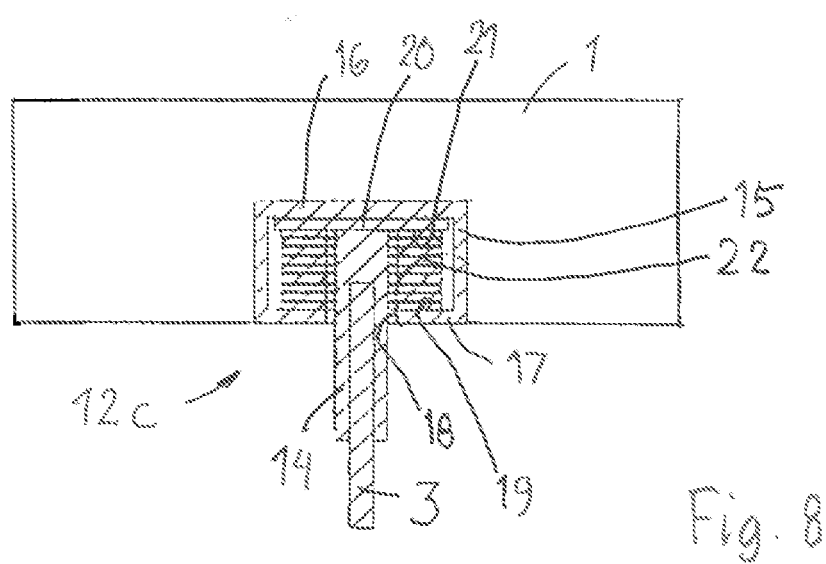

FIGS. 7 and 8 in a similar section as in FIG. 3 illustrate two further examples of the damper.

FIGS. 9 and 10 illustrate still further examples of the damper

FIG. 11 schematically illustrates application of the damper in another example of the invention.

FIG. 12 in a schematic view from above illustrates a wave power plant according to the invention.

DESCRIPTION OF EXAMPLES

Figure 1:
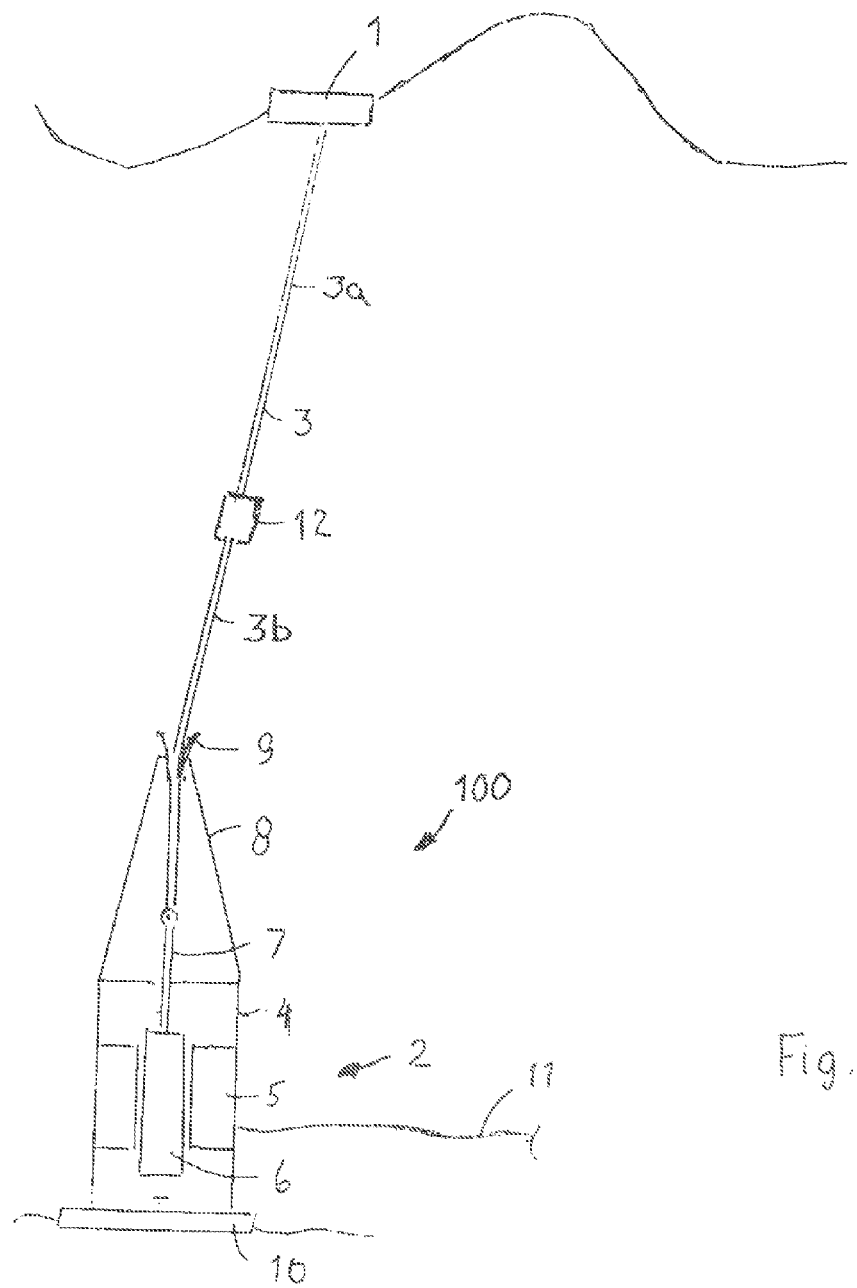

FIG. 1 is a schematically side view of a wave-power unit according to the invention at operation in the sea. A floating body 1 floats on the sea surface and is connected by a connection means 3 such as a cable, wire, rope, chain or the like, to a linear generator 2 anchored at the sea bed and which forms a part of a submerged station 100. In the figure the generator is attached at the sea bed by means of a base foundation 10. It is, however, to be understood that the generator can be located above the sea bed and be anchored in some other way.

The linear generator 2 has a stator 5 with windings and a translator 6 with magnets. The translator 6 is able to reciprocate up and down within the stator 5 thereby generating current in the stator windings, which current by an electric cable 11 is transferred to an electrical network.

The translator 6 is provided with a rod 7 to which the wire 3 is attached. Alternatively the wire 3 can be attached directly to the translator 6, either at the top thereof or at the bottom or somewhere in between. When the floating body 1 due to the wave movements of the sea surface is forced to move up, the floating body will pull the translator 6 upwards. When the floating body thereafter moves down the translator 6 will move down through gravity. Optionally, but preferably a spring (not shown) or the like acting on the translator 6 provides an additional force downwards.

Since the generator 2 is anchored in the sea bed and the floating body 1 floats freely on the water surface, the floating body is free to move laterally in relation to the generator 2. Thereby the connection means 3 will become inclined.

At the entrance of the connection means 3 into the housing 4 of the generator 2 there is provided a guiding device 9 that guides the connection means to move vertically below the guiding device 9 while allowing the connection means 3 that is above the guiding device to move in an inclined position. The guiding device 9 is attached to a conical construction 8 above the housing 4 of the generator and attached thereto.

The guiding device 9 allows the connection means 3 to gradually change its direction when passing through guiding device 9, such that the wear of the connection means becomes limited.

The wire 3 is provided with a damper 12 arranged to absorb snap loads when the wire 3 suddenly becomes tensioned after having been released. In this example the damper is provided between an upper section 3a and a lower section 3b of the wire 3.

In FIG. 2 alternative positions of the damper are illustrated and marked with crosses. The position 12a corresponds to the example of FIG. 1. In the position 12b the damper is arranged between the wire 3 and the bottom end of the translator 6. In the position 12c the damper is arranged between the wire 3 and the floating body 1.

The wave power unit may be provided with a security device as also illustrated in FIG. 2. The security device is a wire 31 attached at one end to the floating body 1 and at the other end to a stationary part of the submerged station, in this example to the base foundation 10 thereof. The security wire 31 is for the purpose of capturing the floating body 1 from drifting away in case the ordinary wire 3 should be broken. Thus during normal operation the security wire 31 is a passive component. The length of the security wire 31 is larger than the ordinary wire 3 such that the floating body can make limited lateral movements without tensioning the security wire 31. In order to keep control on the security wire, a float 32 is connected to a connection point 33 of the security wire. The excess length of the security wire 31 thereby forms a loop. 34.

As shown, also the security wire 31 can be provided with a damper, either at the connection thereof to the floating body 1, position 12d, somewhere along the security wire 31, position 12e or at the connection thereof to the base foundation, position 12f.

An example of the damper 12 is illustrated more in detail in FIG. 3-6. In FIG. 3 the damper is illustrated in an unloaded state. The damper 12 has a housing consisting of an upper end wall 16, a lower end wall 17 and a circumferential wall 15 extending therebetween. The upper end wall 16 is by a connection device 13 attached to an upper section 3a of the wire 3. The lower end wall 17 has a central opening 18, allowing passage of an attachment device 14 attached to a lower section 3a of the wire 3. The upper end of the attachment device 14 has a wall 20 attached thereto, which wall is able to move vertically within the housing 15, 16, 17.

Between the lower end wall 17 of the housing and the movable wall 20 there is a compressible component 22, which is squeezed between a support surface 19 at the lower wall 17 and a support surface 21 at the movable wall 16. The movable wall 16 is vertically movable in relation to the housing 15, 16, 17 and is in FIG. 3 in its upper end position.

Upon high tension in the wire 3, the movable end wall moves downwards in relation to the housing, whereby the compressible body component is compressed between the support surfaces 19 and 22. In FIG. 4 the damper is illustrated in the maximum compressed stage, at which the movable wall 20 is at a relatively short distance from the lower end wall 17 and the compressible component 22 is squeezed to a relatively small thickness. The spring characteristic of the compressible body is such that it requires a considerably strong tension force to reach the state shown in FIG. 4. Such strong forces occur as snap loads when the translator 6 is at its end positions and alter its direction of movement. The forces occurring during the movement of the translator 6 are of a much lower magnitude and will only marginally compress the compressible component 22.

The compressible component 22 consists of a plurality of disc-shaped elastic bodies 23 of rubber or the like separated by rigid plates 24, e.g. of metal. This can be seen more in detail in FIG. 5 illustrating the uncompressed state and FIG. 6 illustrating the compressed state.

FIG. 7 is an example with an alternative position of the damper, corresponding to position 12b in FIG. 2. Thus the damper 12 is arranged between the wire 3 and the translator 6, in the illustrated example at the lower end of the translator 6. The housing 15, 16, 17 of the damper 12 forms an integrated part of the translator 6. The wire 3 is attached to the movable wall 16, which in this fig. Is illustrated at the position when the damper is unloaded. The damper 12 is of the same kind as disclosed in FIG. 3-6, but is mounted upside down in relation to the example in those figures.

The translator has a centrally arranged axial hole 26 therethrough, through which the wire 3, or alternatively a rod 7 such as in FIG. 1, reaches the bottom of the translator 6. The figure also shows the magnets 25 of the translator 6.

FIG. 8 illustrates a further alternative position of damper corresponding to position 12c in FIG. 2. In this case the housing 15, 16, 17 of the damper forms an integral part of the floating body 1, and the movable wall 20 is attached to the upper end of the wire 3.

An alternative example of the damper 121 is illustrated in FIG. 9. The damper 121 in this example differs from the one of FIG. 3 only in that the compression component 22 consists of one single elastic member, e.g. of rubber.

A further alternative is depicted in FIG. 10, where the damper consists of a spiral tension spring 122. Whereas in the earlier examples the damper is compressed when high forces occur, the spring 122 will expand upon occurrence of tensile forces.

The invention can also be applied to a wave power unit of the kind where the generator is a traditional generator, with a rotating rotor 61 and a surrounding stator 51 as shown in FIG. 11. A cylindrical body 62 is connected to the rotor 61 and rotates therewith. As the floating body moves up and down the wire is unwounded and wounded, respectively on the cylindrical body 62 for rotating the rotor 61. The damper 12 in this example performs the same function as the damper of the linear generator described above.

FIG. 12 in a schematic view from above illustrates a wave power plant with a plurality of generators 2 of wave power units according to the invention. The generators 2 are connected to a submerged switchgear 30, which via a connection line 41 is connected to an electrical network 40, such as a grid. A control device controls the energy supply and measures the amount of electric energy supplied, e.g. for billing.

The invention claimed is:

1. A wave power unit which comprises:
a floating body arranged for floating on a sea surface,
a tensile force-absorbing damper which includes a housing defined by parallel upper and lower end walls and a side wall between the upper and lower end walls, a movable wall inside the housing which is parallel to the upper and lower end walls and is movable towards and away from the upper and lower end walls, and a compressible component positioned between the movable wall and the lower end wall, said housing being an integral part of said floating body,
a submerged station which includes a generator having a stator and a movable part, and
a flexible connection means which defines a first end that is connected to said movable part of said generator and an opposite second end which is connected to said movable wall of said damper via an attachment device that extends through an opening in the lower end wall of the housing and connects to said movable wall of said damper,
said damper absorbing tensile forces in the flexible connection means during use of the wave power unit.

2. The wave power unit according to claim 1, wherein the generator comprises a linear generator and the moving part comprises a linearly reciprocating translator.

3. The wave power unit according to claim 1, including a second damper at flexible connection means forming a security device connecting the at least one floating body to a stationary part of the submerged station.

4. The wave power unit according to claim 3, wherein the second damper is located between the stationary part of the submerged station and the flexible connection means forming a security device.

5. The wave power unit according to claim 1, wherein the compressible component includes a plurality of elastic disc-shaped bodies arranged in a stack and a rigid disc-shaped member between each pair of adjacent elastic disc-shaped bodies.

6. The wave power unit according to claim 5, wherein the number of flexible disc-shaped bodies is in the range of 5-15.

7. A wave power plant, wherein the wave power plant includes a plurality of wave power units according to claim 1.

8. An electrical network, wherein the network includes a wave power unit according to claim 1.

9. A wave power unit which comprises:
a floating body arranged for floating on a sea surface,
a submerged station which includes a generator having a stator and a translator movable relative to the stator,
a tensile force-absorbing damper which includes a housing defined by parallel upper and lower parallel end walls and a side wall between the upper and lower end walls, a movable wall inside the housing which is parallel to the upper and lower end walls and is movable towards and away from the upper and lower end walls, and a compressible component positioned between the movable wall and the upper end wall, said housing being an integral part of said translator, and
a flexible connection means which defines a first end that is connected to said movable wall of said damper via an attachment device that extends through an opening in the upper end wall of the housing and connects to said movable wall of said damper and an opposite second end which is connected to said floating body,
said damper absorbing tensile forces in the flexible connection means during use of the wave power unit.

10. The wave power unit according to claim 9, wherein the compressible component includes a plurality of elastic disc-shaped bodies arranged in a stack and a rigid disc-shaped member between each pair of adjacent elastic disc-shaped bodies.

11. The wave power unit according to claim 9, wherein the generator comprises a linear generator and the translator comprises a linearly reciprocating translator.

12. The wave power unit according to claim 9, including a second damper at flexible connection means forming a security device connecting the at least one floating body to a stationary part of the submerged station.

13. The wave power unit according to claim 12, wherein the second damper is located between the stationary part of the submerged station and the flexible connection means forming a security device.

14. A wave power unit which comprises:
a floating body arranged for floating on a sea surface,
a submerged station which includes a base foundation,
a tensile force-absorbing damper which includes a housing defined by parallel upper and lower end walls and a side wall between the upper and lower end walls, a movable wall inside the housing which is parallel to the upper and lower end walls and is movable towards and away from the upper and lower end walls, and a compressible component positioned between the movable wall and the upper end wall, said housing being an integral part of the base foundation of the submerged station, and
a flexible connection means which defines a first end that is connected to said movable wall of said damper and an opposite second end which is connected to said floating body.

15. The wave power unit according to claim 14, wherein the compressible component includes a plurality of elastic disc-shaped bodies arranged in a stack and a rigid disc-shaped member between each pair of adjacent elastic disc-shaped bodies.

* * * * *